US012810234B2

(12) United States Patent
Matsumoto et al.

(10) Patent No.: US 12,810,234 B2
(45) Date of Patent: Nov. 24, 2026

(54) DELIVERY MANAGEMENT SYSTEM, DELIVERY MANAGEMENT METHOD, AND NON-TRANSITORY COMPUTER-READABLE MEDIUM STORING PROGRAM

(71) Applicant: Rakuten Group, Inc., Tokyo (JP)

(72) Inventors: Asaki Matsumoto, Tokyo (JP); Takayoshi Inuma, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 18/824,023

(22) Filed: Sep. 4, 2024

(65) Prior Publication Data

US 2025/0094915 A1 Mar. 20, 2025

(30) Foreign Application Priority Data

Sep. 15, 2023 (JP) ................................ 2023-149873

(51) Int. Cl.
*G06Q 10/083* (2024.01)
*G06Q 10/0832* (2023.01)
*G06Q 10/0833* (2023.01)

(52) U.S. Cl.
CPC ..... *G06Q 10/0832* (2013.01); *G06Q 10/0833* (2013.01)

(58) Field of Classification Search
CPC .................................................. G06Q 10/0833
See application file for complete search history.

(56) References Cited

U.S. PATENT DOCUMENTS

| | | | | |
|---|---|---|---|---|
| 2017/0083856 | A1* | 3/2017 | Song | G06Q 10/0832 |
| 2018/0094953 | A1 | 4/2018 | Calson et al. | |
| 2020/0354084 | A1* | 11/2020 | Priest | B64F 1/32 |
| 2023/0020135 | A1* | 1/2023 | Ferguson | G05D 1/0088 |
| 2023/0066388 | A1 | 3/2023 | Shibayama et al. | |
| 2023/0351310 | A1* | 11/2023 | Bronevetsky | G06F 30/20 |
| 2025/0061408 | A1* | 2/2025 | Majdabadi | G06Q 10/0833 |

FOREIGN PATENT DOCUMENTS

| | | | |
|---|---|---|---|
| JP | 2017-087898 | A | 5/2017 |
| WO | 2021/199486 | A1 | 10/2021 |

OTHER PUBLICATIONS

Kristina Marintseva, Delivery of Special Cargoes Using the Unmanned Aerial Vehicles, 2019 (Year: 2019).*

* cited by examiner

*Primary Examiner* — Ismail A Manejwala
(74) *Attorney, Agent, or Firm* — Sughrue Mion, PLLC

(57) ABSTRACT

A delivery management system includes a memory that stores a program and at least one processor. The at least one processor is configured to execute the program to perform obtaining a delivery address for a package to be delivered by an unmanned mobile unit, obtaining precipitation data for an area that includes the delivery address, and determining a type of packaging for the package. The determining includes selecting one of multiple types of packaging including standard packaging and precipitation-resistant packaging based on the precipitation data.

13 Claims, 7 Drawing Sheets

Fig.2

40

| User ID | Address | Terminal ID | Notification Target |
|---|---|---|---|
| **** | **** | **** | **** |
| **** | **** | **** | **** |
| : | : | : | : |

40A

Fig.3

41

| Delivery Hub ID | Hub Address | Notification Target |
|---|---|---|
| **** | **** | **** |
| **** | **** | **** |
| : | : | : |

41A

Fig.4

42

| Delivery Number | User ID | Delivery Address | Delivery Hub ID | Unmanned Vehicle ID | • • • |
|---|---|---|---|---|---|
| **** | **** | **** | **** | **** | • • • |
| **** | **** | **** | **** | **** | • • • |
| **** | **** | **** | **** | **** | • • • |
| : | : | : | : | : | : |

42A

| Delivery Item | Delivery Date and Time | Delivery Route | Delivery Start Date and Time | Ground Attribute Data | Delivery Status |
|---|---|---|---|---|---|
| **** | **** | **** | **** | **** | **** |
| **** | **** | **** | **** | **** | **** |
| **** | **** | **** | **** | **** | **** |
| : | : | : | : | : | : |

DELIVERY MANAGEMENT SYSTEM, DELIVERY MANAGEMENT METHOD, AND NON-TRANSITORY COMPUTER-READABLE MEDIUM STORING PROGRAM

CROSS-REFERENCE TO RELATED APPLICATIONS

This application is based upon and claims the benefit of priority from prior Japanese Patent Application No. 2023-149873, filed on Sep. 15, 2023, the entire contents of which are incorporated herein by reference.

BACKGROUND

1. Field

The present disclosure relates to a delivery management system, a delivery management method, and a non-transitory computer-readable medium storing a program.

2. Description of Related Art

Japanese Laid-Open Patent Publication No. 2017-87898 discloses a system for delivering packages using unmanned mobile units such as drones, as an example of a system that performs unattended delivery. Unattended delivery means that the delivery is completed by leaving the package at the doorstep or other location without the intended recipient being present to receive it. For instance, the package may be dropped within the premises by the unmanned mobile unit at the delivery address.

If such an unattended delivered package is left outdoors, there is a risk that the contents may get wet due to rain during delivery or before the package is collected.

SUMMARY

This Summary is provided to introduce a selection of concepts in a simplified form that are further described below in the Detailed Description. This Summary is not intended to identify key characteristics or essential characteristics of the claimed subject matter, nor is it intended to be used as an aid in determining the scope of the claimed subject matter.

A delivery management system according to an aspect of the present disclosure includes a memory that stores a program and at least one processor. The at least one processor is configured to execute the program to perform obtaining a delivery address for a package to be delivered by an unmanned mobile unit, obtaining precipitation data for an area that includes the delivery address, and determining a type of packaging for the package. The determining includes selecting one of multiple types of packaging including standard packaging and precipitation-resistant packaging based on the precipitation data.

A delivery management method according to an aspect of the present disclosure includes obtaining, by one or more computers, a delivery address for a package to be delivered by an unmanned mobile unit, obtaining, by the one or more computers, precipitation data for an area that includes the delivery address, and determining, by the one or more computers, a type of packaging for the package. The determining includes selecting one of multiple types of packaging including standard packaging and precipitation-resistant packaging based on the precipitation data.

A non-transitory computer-readable medium according to an aspect of the present disclosure includes stores a program for causing one or more computers to execute obtaining a delivery address for a package to be delivered by an unmanned mobile unit, obtaining precipitation data for an area that includes the delivery address, and determining a type of packaging for the package. The determining includes selecting one of multiple types of packaging including standard packaging and precipitation-resistant packaging based on the precipitation data.

Other features and aspects will be apparent from the following detailed description, the drawings, and the claims.

BRIEF DESCRIPTION OF DRAWINGS

FIG. 2 is a table illustrating a user management database in the first embodiment.

FIG. 3 is a table illustrating a delivery hub database in the first embodiment.

FIG. 4 is a table illustrating a delivery management database in the first embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be switched as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A delivery management system, a delivery management method, and a non-transitory computer-readable medium storing a program according to an embodiment will now be described.

Configuration of Delivery Management System 1

Figure 1:
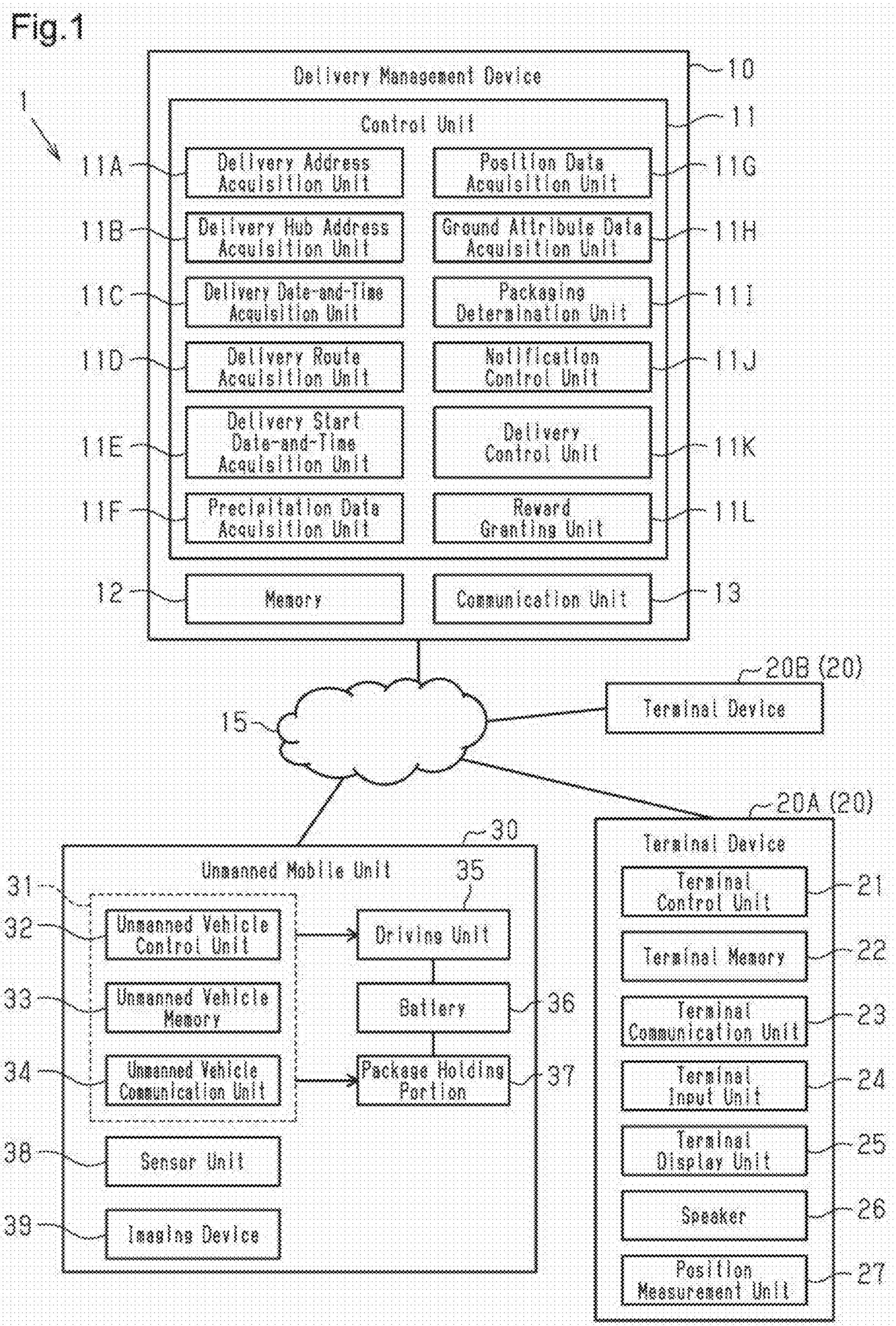
FIG. 1 is a diagram illustrating an overall configuration of the delivery management system according to a first embodiment.

Referring to FIG. 1, a delivery management system 1 delivers packages to a delivery address. Specifically, the delivery of packages includes unattended delivery. Unattended delivery is a service where packages are delivered to the intended recipient without direct interaction at the delivery address. The delivery address is the location where the packages are delivered. The intended recipient is a user of the delivery management system 1 and is the person scheduled to receive the delivered packages.

The delivery management system 1 includes a delivery management device 10, a terminal device 20, and an unmanned mobile unit 30. The delivery management system 1 may include multiple terminal devices 20. The terminal devices 20 may include a user terminal device 20A and a work terminal device 20B.

The user terminal device 20A is available for the intended recipient. The user terminal device 20A may be portable by the intended recipient. The work terminal device 20B is used by a worker packaging delivery items at a delivery hub. The package delivery hub may be a store that manages packages or a collection site where packages are picked up. The user terminal device 20A and the work terminal device 20B have similar configurations. Thus, the terminal devices 20 may be hereinafter collectively described. The user terminal device 20A and the work terminal device 20B will be described separately as needed.

The delivery management device 10, the terminal device 20, and the unmanned mobile unit 30 are connected via a network 15 in a communicable manner. Hereinafter, communication between the devices via the network 15 will not be described. Hereinafter, the unmanned mobile unit 30 may be referred to as an unmanned vehicle.

Configuration of Delivery Management Device 10

The delivery management device 10 manages data related to the delivery of packages. The delivery management device 10 is managed by the manager of the delivery service. The delivery management device 10 includes one or more computers.

The delivery management device 10 includes a control unit 11, a memory 12, and a communication unit 13. The control unit 11 includes an arithmetic logic unit and a main storage medium. The arithmetic logic unit loads an operating system (OS) and programs from the memory 12 into the main storage medium and executes instructions retrieved from the main storage medium. The arithmetic logic unit includes one or more circuits, or circuitry. The circuitry includes one or more processors. The processors may include a central processing unit (CPU), a graphic processing unit (GPU), or a neural network processing unit (NPU). The memory 12 is an auxiliary storage medium and may store programs. The memory 12 is a storage that stores various types of data for managing package delivery.

The communication unit 13 is implemented as hardware, software, or a combination thereof. The communication unit 13 sends and receives data to and from the terminal device 20 and the unmanned mobile unit 30. The delivery management device 10 may include an operation unit for the manager or other persons to perform input operations, and may also include a display unit that displays information.

Configuration of Terminal Device 20

The terminal device 20 includes one or more computers. The terminal device 20 is a smartphone, feature phone, tablet device, wearable computer, or another type of device capable of displaying images.

The terminal device 20 includes a terminal control unit 21, a terminal memory 22, a terminal communication unit 23, a terminal input unit 24, a terminal display unit 25, and a speaker 26. The terminal control unit 21 is configured to control the terminal device 20. The terminal control unit 21 includes an arithmetic logic unit and a main storage medium. The terminal control unit 21 has the same configuration as the control unit 11. Thus, the arithmetic logic unit and the main storage medium will not be described.

The terminal memory 22 is an auxiliary storage medium, and is a storage that stores various types of data. In particular, the terminal memory 22 may store a notification program capable of receiving notifications related to delivery. The notification program may be a dedicated program for receiving delivery services. The notification program may be a program that uses social networking services. The notification program may be an email client capable of receiving notification emails.

The terminal communication unit 23 is implemented as hardware, software, or a combination thereof. The terminal communication unit 23 sends and receives data to and from the delivery management device 10 and the unmanned mobile unit 30.

The terminal input unit 24 is configured to input a signal according to an operation by the intended recipient. The terminal input unit 24 may be a pointing device such as an operation button. The terminal input unit 24 may be a touch panel integrated with the terminal display unit 25. The terminal display unit 25 displays various images according to output instructions from the terminal control unit 21. The speaker 26 outputs various types of sound in response to output instructions from the terminal control unit 21.

The terminal device 20 may include a position measurement unit 27. The position measurement unit 27 obtains the position data of the terminal device 20 by measuring the position of the terminal device 20. In other words, the position measurement unit 27 measures the position of the intended recipient. The position measurement unit 27 may be a global positioning system (GPS) sensor.

Configuration of Unmanned Mobile Unit 30

The unmanned mobile unit 30 is capable of delivering packages without a human onboard. The unmanned mobile unit 30 may be an aircraft that flies through the air without a human pilot onboard and is also referred to as a drone. The unmanned mobile unit 30 may be managed by the manager of the delivery service or by another owner of the unmanned mobile unit 30.

The unmanned mobile unit 30 includes an unmanned vehicle controller 31. The unmanned vehicle controller 31 is, for example, a computer and includes an unmanned vehicle control unit 32, an unmanned vehicle memory 33, and an unmanned vehicle communication unit 34. The unmanned vehicle control unit 32 is configured to control the unmanned mobile unit 30. The unmanned vehicle control unit 32 includes an arithmetic logic unit and a main storage medium. The unmanned vehicle control unit 32 has the same configuration as the control unit 11. Thus, the arithmetic logic unit and the main storage medium will not be described. The unmanned vehicle memory 33 is an auxiliary storage medium, and is a storage that stores various types of data for package delivery.

The unmanned vehicle communication unit 34 is implemented as hardware, software, or a combination thereof. The unmanned vehicle communication unit 34 sends and receives data to and from the delivery management device 10 and the terminal device 20.

The unmanned mobile unit 30 includes a driving unit 35 and a battery 36. The driving unit 35 includes a driving source and a rotary wing. The driving source is configured to operate using the electric power supplied from the battery 36. The driving source may be an electric motor. The rotary wing is configured to operate using the power supplied from the driving source. The battery 36 is the energy source for at least the driving unit 35 and may also be the energy source for the unmanned mobile unit 30. The battery 36 may be a rechargeable battery.

The driving unit 35 may be an engine that operates by consuming fuel. In this case, the battery 36 is replaced with a fuel supplying unit that supplies fuel to the driving unit 35. The unmanned mobile unit 30 may include a hybrid driving unit 35 equipped with various types of driving sources.

The unmanned mobile unit 30 may include a package holding portion 37. The package holding portion 37 is configured to hold the package until it reaches the delivery address. The package holding portion 37 delivers the package by releasing it at the delivery address. The package holding portion 37 is configured to be driven by the electric power supplied from the battery 36.

The package holding portion 37 may include a reel or a winch. The package holding portion 37 may include a hook and a cable. The hook allows for the detachment of the package. The hook may be located at the end of the cable. The hook may release the package when the tension decreases as the cable slackens. The hook may release the package through either electrification or de-electrification. The package holding portion 37 may include a support arm for supporting the package and a driving mechanism for the support arm.

The unmanned mobile unit 30 may include a sensor unit 38. The sensor unit 38 may include a GPS sensor that detects the current position. The sensor unit 38 may include a ranging sensor. The ranging sensor may be a time-of-flight (ToF) sensor that measures and detects the time of flight. The ranging sensor may be a LiDAR, radar, or ultrasonic sensor. LiDAR ranging sensors emit laser pulses towards a target object and measure the time difference until the laser light reflects back from the target object. The ranging sensor uses the time difference to measure the distance to the target object, the position of the target object, or the shape of the target object. The radar emits radio waves (e.g., millimeter waves) towards a target object and measures the time difference until the laser light reflects back from the target object. The ultrasonic sensor emits ultrasonic waves towards a target object. The sensor unit 38 may include at least one of a sensor that detects wind direction and wind speed, an acceleration sensor, a gyro sensor, an infrared sensor, a geomagnetic sensor, an altitude sensor, a displacement sensor, and a temperature sensor.

The unmanned mobile unit 30 may include one or more imaging devices 39. The imaging device 39 is configured to capture an image. For example, the imaging device 39 is a visible light camera. Further, for example, the imaging device 39 is an omnidirectional camera.

Thus, the unmanned mobile unit 30 is capable of obtaining the data detected by the sensor unit 38 and recognizing the position data of the unmanned mobile unit 30. The unmanned mobile unit 30 processes the captured data obtained from the imaging device 39 to recognize an obstacle and the surrounding environment, including a package delivery position.

Configuration of Control Unit 11

The configuration of the control unit 11 will be now be described.

By executing a program, the control unit 11 operates as a delivery address acquisition unit 11A, a delivery hub address acquisition unit 11B, a delivery date-and-time acquisition unit 11C, a delivery route acquisition unit 11D, and a delivery start date-and-time acquisition unit 11E. By executing another program, the control unit 11 operates as a precipitation data acquisition unit 11F, a position data acquisition unit 11G, a ground attribute data acquisition unit 11H, a packaging determination unit 11I, a notification control unit 11J, a delivery control unit 11K, and a reward granting unit 11L.

The delivery address acquisition unit 11A obtains the delivery address for the package delivered by the unmanned mobile unit 30. In particular, the delivery address acquisition unit 11A obtains the delivery address for the package delivered by the unmanned mobile unit 30 according to instructions from the intended recipient. The delivery address is, for example, the address of the intended recipient. Alternatively, the delivery address may be the work address of the intended recipient or may be a public facility such as a community center.

The delivery hub address acquisition unit 11B obtains a delivery hub address for the package delivered by the unmanned mobile unit 30. For example, when the delivery hub is a store that sells items, the delivery hub address may be the address of the store from which the unmanned mobile unit 30 picks up delivery items packaged using predetermined packaging. Thus, when the delivery hub is a store selling items, the store staff act both as sales clerks who sell the items and as workers who package the items, as delivery items, using predetermined packaging according to item orders.

The delivery date-and-time acquisition unit 11C obtains a delivery date and time for the package delivered by the unmanned mobile unit 30. The delivery date and time refers to the date and time at which the unmanned mobile unit 30 delivers the package to the delivery address. In particular, the delivery date-and-time acquisition unit 11C obtains the package delivery date and time according to instructions from the intended recipient.

The delivery route acquisition unit 11D obtains a delivery route for the package from package delivery hub address to the package delivery address. Specifically, the delivery route acquisition unit 11D obtains the package delivery route based on the position data of the package delivery hub address and the position data of the package delivery address. When the unmanned mobile unit 30 is an unmanned aerial vehicle, the delivery route for the package may be a direct route connecting the package delivery hub address to the package delivery address. Instead, the route may also bypass no-fly zones.

The delivery start date-and-time acquisition unit 11E obtains a delivery start date and time for the package delivered by the unmanned mobile unit 30. The delivery start date and time for the package is when the unmanned mobile unit 30 departs from the package delivery hub address toward the package delivery address. In other words, the package delivery start date and time is the date and time to start package delivery from the package delivery hub address.

In particular, the delivery start date-and-time acquisition unit 11E obtains the package delivery start date and time based on the position data of the package delivery hub address, the position data of the package delivery address, and the package delivery date and time. Specifically, the delivery start date-and-time acquisition unit 11E obtains the delivery distance corresponding to the package delivery route. The delivery start date-and-time acquisition unit 11E obtains a delivery travel time based on the delivery distance and the travel speed of the unmanned mobile unit 30. The delivery travel time is the time required for the unmanned mobile unit 30 to travel from the package delivery hub address to the package delivery address. The delivery start date-and-time acquisition unit 11E obtains, as the package delivery start date and time, a date and time earlier than the delivery date and time by the delivery travel time. Thus, the delivery start date-and-time acquisition unit 11E obtains the package delivery start date and time based on the package delivery hub address, the package delivery address, and the package delivery date and time.

The precipitation data acquisition unit 11F obtains precipitation data corresponding to an area that includes the package delivery address. Particularly, the precipitation data acquisition unit 11F obtains precipitation data corresponding to the area that includes the package delivery address at the package delivery date and time. Further, the precipitation data acquisition unit 11F obtains precipitation data corresponding to an area that includes the package delivery route. Particularly, the precipitation data acquisition unit 11F obtains precipitation data corresponding to the area that includes the package delivery route during a period from the package delivery start date and time to the package delivery date and time.

The precipitation data acquisition unit 11F may obtain predicted weather as precipitation data. Examples of the predicted weather include clear, cloudy, and rainy conditions. The precipitation data acquisition unit 11F may obtain a predicted precipitation probability as precipitation data. The precipitation data acquisition unit 11F may obtain a predicted precipitation amount as precipitation data. The predicted precipitation probability may include a predicted rainfall probability and a predicted snowfall probability. The predicted precipitation amount may include a predicted rainfall amount and a predicted snowfall amount. The precipitation data acquisition unit 11F may obtain precipitation data by communicating with a server that provides precipitation data.

The position data acquisition unit 11G obtains the position data of the intended recipient. The position data acquisition unit 11G, in particular, obtains the position data of the intended recipient by obtaining the position data of the user terminal device 20A through communication with the user terminal device 20A.

The ground attribute data acquisition unit 11H obtains ground attribute data at the package delivery address (location for unattended delivery). The ground attribute data indicates the attributes of the ground where the package will be left. The ground attribute data may include a paved surface, indicating a paved ground, and an unpaved surface, indicating an unpaved soil ground. The ground attribute data acquisition unit 11H may obtain the ground attribute data based on instructions from the intended recipient through communication with the user terminal device 20A. The unmanned mobile unit 30 may obtain the ground attribute data from captured images when it moves to the delivery address in advance.

The packaging determination unit 11I determines the type of packaging for the package. The packaging determination unit 11I selects one of multiple types of packaging for the package. Multiple types of packaging for the package may include standard packaging and precipitation-resistant packaging. Standard packaging does not account for protection against precipitation. Standard packaging may be non-waterproof. Precipitation-resistant packaging can maintain the quality of a package even during precipitation. Precipitation-resistant packaging may be waterproof. Precipitation-resistant packaging may be more expensive than standard packaging. For example, the standard packaging is cardboard, while the precipitation-resistant packaging involves applying to a waterproof bag or case to the standard packaging.

The packaging determination unit 11I selects one of the types of packaging based on precipitation data. Particularly, the packaging determination unit 11I selects one of the types of packaging based on precipitation data for the area including the package delivery address at the package delivery date and time. The packaging determination unit 11I selects one of the types of packaging based on precipitation data for the area that includes the package delivery route during the period between the package delivery start date and time and the package delivery date and time. The packaging determination unit 11I selects one of the types of packaging at a date and time prior to the package delivery start date and time.

The notification control unit 11J manages notifications related to package delivery. The notification control unit 11J performs a control to notify the workers at the delivery hub address of the data related to packaging for the package. The notification control unit 11J may perform control to notify the intended recipient of the data related to package delivery.

The delivery control unit 11K performs a control related to package delivery by the unmanned mobile unit 30. The delivery control unit 11K initiates package delivery by the unmanned mobile unit 30 at the delivery hub address when the delivery start date and time arrives.

The reward granting unit 11L grants rewards to the intended recipient. In particular, the reward granting unit 11L may grant rewards to the intended recipient when a reward granting condition is satisfied. Rewards may be points from a multipoint program available for various services. The reward value may be the number of points. Rewards may be available through a system that is different from the delivery management system 1. The rewards may be available across multiple systems managed by the same manager or across multiple systems each managed by a different manager. For example, rewards may be available in electronic commerce. Rewards may be available for the purchase of items that are delivered as packages via electronic commerce. Rewards may be incentives for the user.

Database

The database stored in memory 12 will now be described with reference to FIGS. 2 to 4.

As shown in FIG. 2, the memory 12 stores a user management database 40. The user management database 40 includes one or more user datasets 40A. The user may be the intended recipient. The user management database 40 manages the user datasets 40A.

The user datasets 40A include user records for each of multiple users. Each user record contains a user ID, user address, terminal ID, and user notification target. Namely, the user ID is associated with the address, terminal ID, and notification target of a corresponding user. The user ID may be associated with the reward value owned by the corresponding user.

The user ID is an identifier used to identify the intended recipient. The user address may be position data indicating the delivery address. The terminal ID is an identifier used to identify the user terminal device 20A owned by the user. The terminal ID is referenced to obtain the position data of the user terminal device 20A. The user notification target may be, for example, the email address of the user or a device token associated with the user terminal device 20A.

As shown in FIG. 3, the memory 12 stores a delivery hub database 41. The delivery hub database 41 includes one or more delivery hub datasets 41A. The delivery hub database 41 stores data for managing the delivery hub datasets 41A.

The delivery hub datasets 41A include hub records for each of multiple delivery hubs. Each hub record includes a delivery hub ID, delivery hub address, and delivery hub notification target. The delivery hub ID is associated with the address and notification target of a corresponding delivery hub.

The delivery hub ID is an identifier used to identify the delivery hub. The delivery hub address is position data that indicates the delivery hub. The delivery hub notification target indicates the point of contact for a worker at the delivery hub, and may be the email address of the delivery hub or a device token associated with the work terminal device 20B.

As shown in FIG. 4, the memory 12 stores a delivery management database 42. The delivery management database 42 includes one or more delivery datasets 42A. The delivery management database 42 manages the delivery datasets 42A.

The delivery datasets 42A include a delivery record for each of multiple deliveries. Each delivery record includes a delivery number, user ID, delivery address, delivery hub ID, unmanned vehicle ID, delivery item, delivery date and time, delivery route, delivery start date and time, ground attribute data, and delivery status. The delivery number is associated with the user ID, delivery address, delivery hub ID, unmanned vehicle ID, delivery item, delivery date and time, delivery route, delivery start date and time, ground attribute data, and delivery status of a corresponding delivery.

The delivery number is an identifier assigned to a package delivery. The delivery address is the location where the package will be delivered. The unmanned vehicle ID is an identifier used to identify the unmanned mobile unit 30 that delivers the package.

The delivery item indicates the type or product name of the package to be delivered by the unmanned mobile unit 30. The delivery date and time indicates the scheduled date and time when the unmanned mobile unit 30 will deliver the package to the delivery address. The delivery route indicates a route from the delivery hub address to the delivery address. The delivery start date and time indicate when the unmanned mobile unit 30 will depart from the delivery hub address to the delivery address. The ground attribute data indicate the attributes of the ground where the package will be placed at the delivery address. The delivery status indicates the stage of the package delivery, and may show whether it is awaiting delivery, in transit, or completed.

Delivery Setting Process

The delivery setting process executed in the delivery management device 10 will now be described with reference to FIG. 5. The delivery setting process is executed by the control unit 11 at a predetermined cycle or at any given time.

Figure 5:
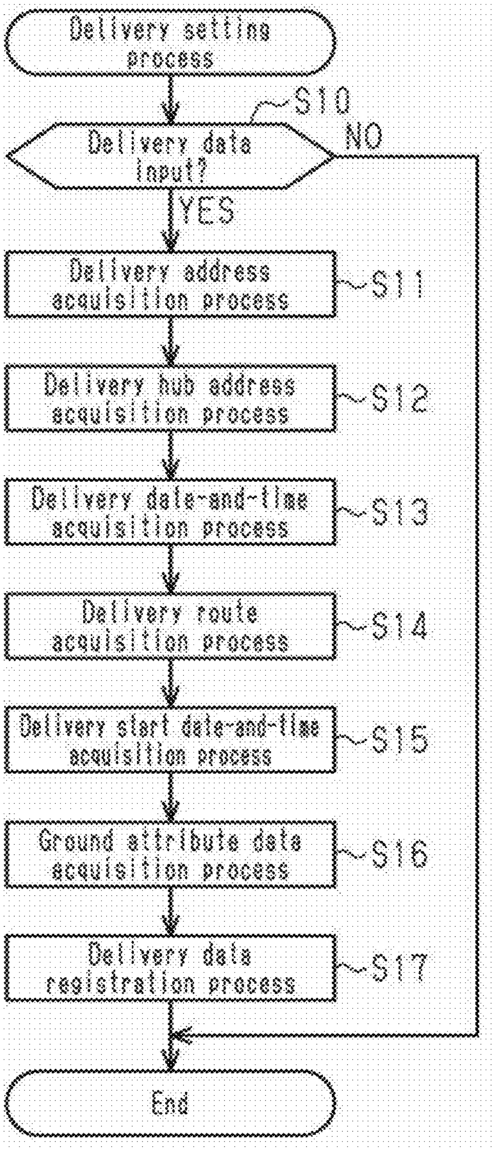
FIG. 5 is a flowchart illustrating a delivery setting process executed by the delivery management device in the first embodiment.

As shown in FIG. 5, in step S10, the control unit 11 of the delivery management device 10 determines whether the delivery datasets 42A have been entered. The control unit 11 may determine whether the delivery datasets 42A have been entered through communication with the terminal device 20, whether via another server or not. The delivery datasets 42A may include the user ID, delivery address, and delivery date and time. The delivery datasets 42A may also include the delivery hub address and delivery item. The delivery datasets 42A may further include the ground attribute data. When the control unit 11 determines that the delivery datasets 42A have not been entered, it terminates the delivery setting process. When determining that the delivery datasets 42A have been entered, the control unit 11 advances the process to step S11.

In step S11, the control unit 11 executes a delivery address acquisition process. In the delivery address acquisition process, the control unit 11 obtains the delivery address included in the delivery datasets 42A. In other words, the control unit 11 obtains the delivery address for the package delivered by the unmanned mobile unit 30.

In step S12, the control unit 11 executes a delivery hub address acquisition process. In the delivery hub address acquisition process, the control unit 11 obtains the delivery hub ID included in the delivery datasets 42A. The control unit 11 obtains the delivery hub address corresponding to the delivery hub ID from the delivery hub datasets 41A. In other words, the control unit 11 obtains the delivery hub address for the package delivered by the unmanned mobile unit 30.

In step S13, the control unit 11 executes a delivery date-and-time acquisition process. In the delivery date-and-time acquisition process, the control unit 11 obtains the delivery date and time included in the delivery datasets 42A. In other words, the control unit 11 obtains the delivery date and time for the package delivered by the unmanned mobile unit 30.

In step S14, the control unit 11 executes a delivery route acquisition process. In the delivery route acquisition process, the control unit 11 obtains the package delivery route based on the position data of the delivery hub address and the position data of the delivery address. Particularly, the control unit 11 may obtain, as the delivery route, a route that bypasses predetermined no-fly zones and ensures the shortest travel time from the delivery hub address to the delivery address. The control unit 11 may obtain, as the delivery route, a route that ensures the shortest travel time from the delivery hub address to the delivery address. Thus, the control unit 11 obtains the package delivery route from the package delivery hub address to the package delivery address.

In step S15, the control unit 11 executes a delivery start date-and-time acquisition process. In the delivery start date-and-time acquisition process, the control unit 11 obtains the delivery distance corresponding to the package delivery route. The control unit 11 may calculate the delivery travel time based on the delivery distance and the movement speed of the unmanned mobile unit 30. The control unit 11 may calculate the delivery start date and time based on the delivery date and time and delivery travel time. The control unit 11 may calculate, as the delivery start date and time, a date and time earlier than the delivery date and time by the delivery travel time. Thus, the control unit 11 obtains the package delivery start date and time, at which the package delivery starts at the package delivery hub address, based on the package delivery hub address, package delivery address, and package delivery date and time.

In step S16, the control unit 11 executes a ground attribute data acquisition process. In the ground attribute data acquisition process, the control unit 11 obtains the ground attribute data included in the delivery datasets 42A. In other words, the control unit 11 obtains the attributes of the ground at the location where the package will be placed.

In step S17, the control unit 11 executes a delivery data registration process. In the delivery data registration process, the control unit 11 generates the delivery number. The control unit 11 registers the delivery datasets 42A, which include the delivery number, in the delivery management database 42. Specifically, the control unit 11 determines the unmanned vehicle ID corresponding to the delivery number based on delivery plan data for the unmanned mobile unit 30. The control unit 11 registers the delivery datasets 42A, in the delivery management database 42, including the delivery number, user ID, delivery address, delivery hub address, unmanned vehicle ID, delivery item, delivery date and time, delivery route, delivery start date and time, and ground attribute data. The control unit 11 registers data indicating a status of awaiting delivery corresponding to the delivery number.

First Delivery Preparation Process

The first delivery preparation process executed in the delivery management device 10 will now be described with reference to FIG. 6. The first delivery preparation process is executed by the control unit 11 at a predetermined interval or at any given time. The first delivery preparation process is executed for one or more deliveries where the delivery status is awaiting delivery. In the description below, an example in which the process is executed for a single delivery will be described to facilitate understanding of the invention.

Figure 6:
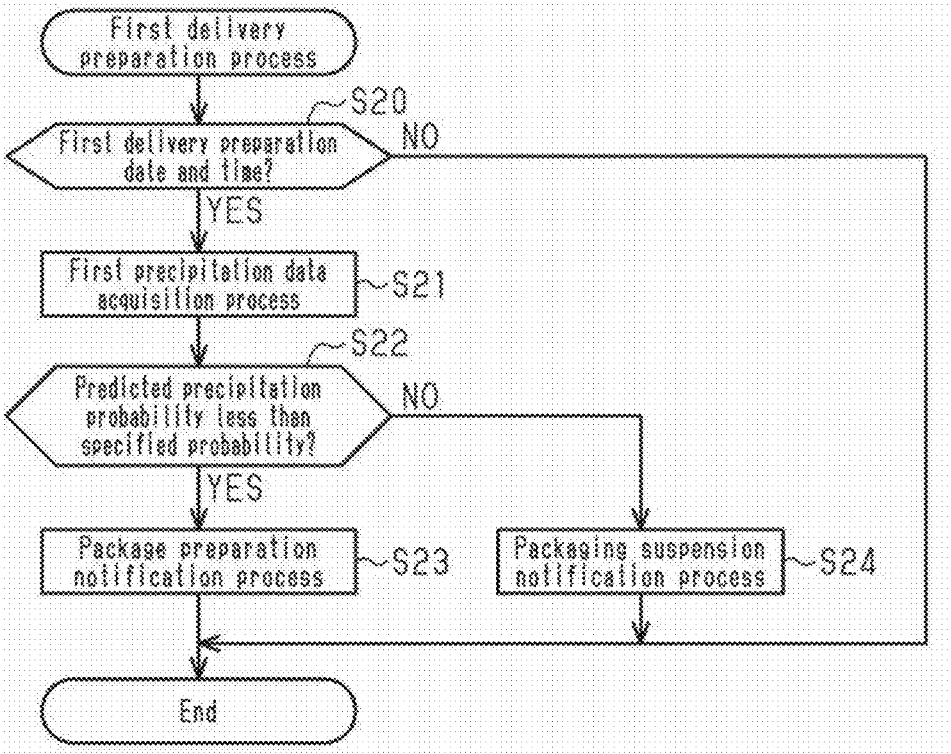
FIG. 6 is a flowchart illustrating a first delivery preparation process executed by the delivery management device in the first embodiment.

As shown in FIG. 6, in step S20, the control unit 11 determines whether a first delivery preparation date and time has been reached. The first delivery preparation date and time is earlier than the delivery start date and time by a predetermined time. The first delivery preparation date and time may be thirty minutes before the delivery start date and time. The first delivery preparation date and time corresponds to an example of a first date and time that is earlier than the package delivery start date and time.

The control unit 11 obtains, from the delivery management database 42, the delivery start date and time corresponding to the delivery number for the delivery target. The control unit 11 obtains, as the first delivery preparation date and time, the date and time that is earlier than the delivery start date and time by the predetermined time. When determining that the first delivery preparation date and time has not been reached, the control unit 11 terminates the first delivery preparation process. When determining that the first delivery preparation date and time has been reached, the control unit 11 advances the process to step S21.

In step S21, the control unit 11 executes a first precipitation data acquisition process. In the first precipitation data acquisition process, the control unit 11 obtains precipitation data through communication with a server that provides precipitation data. Specifically, the control unit 11 obtains precipitation data for an area including the package delivery route during the period from the delivery start date and time to the delivery date and time. The control unit 11 may obtain precipitation data for an area that includes the package delivery address at the delivery date and time. In particular, the control unit 11 obtains the predicted precipitation probability as precipitation data.

In step S22, the control unit 11 determines whether the predicted precipitation probability is less than a specified precipitation probability. The specified precipitation probability is a high probability of precipitation, indicating a significantly high likelihood of precipitation. The specified precipitation probability may be, for example, 80%. When determining that the predicted precipitation probability is less than the specified precipitation probability, the control unit 11 advances the process to step S23. When determining that the predicted precipitation probability is greater than or equal to the specified precipitation probability, the control unit 11 advances the process to step S24.

In step S23, the control unit 11 executes a package preparation notification process. In the package preparation notification process, the control unit 11 sends package preparation data to the work terminal device 20B corresponding to the delivery hub ID. The package preparation data includes a notification to inform that preparation will be started for package delivery using standard packaging. The package preparation data may include the delivery datasets 42A. When the package preparation notification process is completed, the control unit 11 terminates the first delivery preparation process.

In the work terminal device 20B, when the terminal control unit 21 receives the package preparation data, the terminal control unit 21 displays an image on the terminal display unit 25 indicating that preparation will be started for package delivery using standard packaging. Thus, when the predicted precipitation probability is less than the specified probability at the first delivery preparation date and time, the control unit 11 provisionally determines that standard packaging has been chosen as packaging for the package. Then, the control unit 11 performs a control to notify the worker that package preparation using standard packaging will be started.

In step S24, the control unit 11 executes a packaging suspension notification process. In the packaging suspension notification process, the control unit 11 sends packaging suspension data to the work terminal device 20B corresponding to the delivery hub ID. The packaging suspension data indicates suspension of packaging for the package without specifying the type of packaging. The packaging suspension data includes a notification to inform that preparation will be started for package delivery. The packaging suspension data may include the delivery datasets 42A. When the packaging suspension notification process is completed, the control unit 11 terminates the first delivery preparation process.

In the work terminal device 20B, when the terminal control unit 21 receives the packaging suspension data, the terminal control unit 21 displays an image on the terminal display unit 25 indicating that packaging for the package will be suspended but preparation will be started for package delivery. Thus, when the predicted precipitation probability is greater than or equal to than the specified probability at the first delivery preparation date and time, the control unit 11 performs a control to notify the worker that packaging for the package will be suspended.

Second Delivery Preparation Process

The second delivery preparation process executed in the delivery management device 10 will now be described with reference to FIG. 7. The second delivery preparation process is executed by the control unit 11 at a predetermined interval or at any given time. The second delivery preparation process is executed for one or more deliveries where the delivery status is awaiting delivery. In the description below, an example in which the process is executed for a single delivery will be described to facilitate the understanding of the invention.

Figure 7:
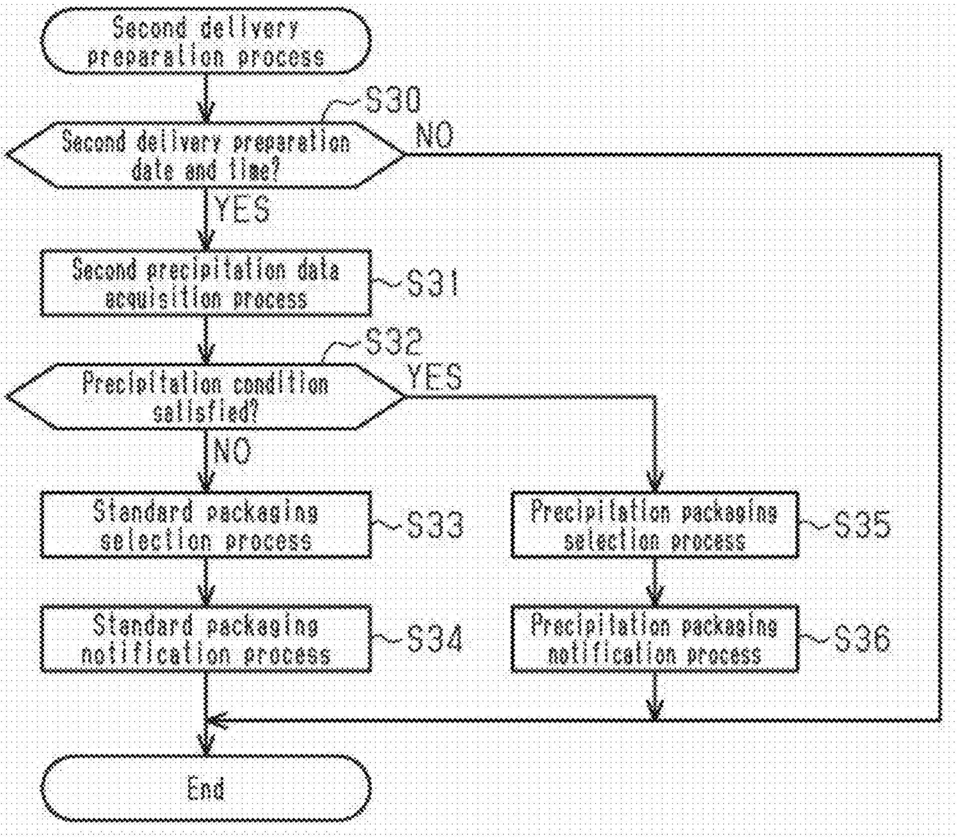
FIG. 7 is a flowchart illustrating a second delivery preparation process executed by the delivery management device in the first embodiment.

As shown in FIG. 7, in step S30, the control unit 11 determines whether a second delivery preparation date and time has been reached. The second delivery preparation date and time is earlier than the delivery start date and time by a predetermined time. The second delivery preparation date and time may be later than the first delivery preparation date and time. The second date and time delivery preparation date and time may be five minutes before the delivery start date and time.

The control unit 11 obtains, from the delivery management database 42, the delivery start date and time corresponding to the delivery number for the delivery target. The control unit 11 obtains, as a second date and time delivery preparation date and time, the date and time that is earlier than the delivery start date and time by the predetermined time. When determining that the second delivery preparation date and time has not been reached, the control unit 11 terminates the second delivery preparation process. When determining that the second delivery preparation date and time has been reached, the control unit 11 advances the process to step S31.

In step S31, the control unit 11 executes a second precipitation data acquisition process. In the second precipitation data acquisition process, the control unit 11 obtains precipitation data through communication with a server that provides precipitation data. Specifically, the control unit 11 obtains precipitation data corresponding to the period from the delivery start date and time to the delivery date and time and corresponding to an area including the package delivery route. The control unit 11 obtains precipitation data corresponding to the delivery date and time and corresponding to the area including the package delivery address. In particular, the control unit 11 obtains predicted weather as the precipitation data. Further, the control unit 11 obtains the predicted precipitation amount as the precipitation data. In other words, the control unit 11 obtains, as the precipitation data, the predicted precipitation amount corresponding to the period from the package delivery start date and time to the package delivery date and time and corresponding to the area including the package delivery route.

In step S32, the control unit 11 determines whether a precipitation condition is satisfied. The precipitation condition is satisfied when the predicted weather includes rainy conditions. The precipitation condition is satisfied when the result of calculating the predicted precipitation amount and the duration from the delivery start date and time to the delivery date and time is greater than or equal to a predetermined threshold value. The threshold value is a reference value at which the quality of package cannot be maintained when packaged using standard packaging.

For example, the control unit 11 calculates, as the predicted total precipitation amount for the delivery route, the result of accumulating the duration from the delivery start date and time to the delivery date and time with the predicted precipitation amount. The control unit 11 determines that the precipitation condition is satisfied when the predicted total precipitation amount for the delivery route is greater than or equal to a threshold value.

When determining that the precipitation condition is not satisfied, the control unit 11 advances the process to step S33. When determining that the precipitation condition is satisfied, the control unit 11 advances the process to step S35.

In step S33, the control unit 11 executes a standard packaging selection process. In the standard packaging selection process, the control unit 11 selects standard packaging as packaging for the package. Thus, when the precipitation condition is not satisfied based on the total precipitation amount in the package delivery route at the second delivery preparation date and time, which is before the package delivery start date and time, the control unit 11 selects the standard packaging for the package.

In step S34, the control unit 11 executes a standard packaging notification process. In the standard packaging notification process, the control unit 11 sends standard packaging specifying data to the work terminal device 20B corresponding to the delivery hub ID. The standard packaging specifying data is used to notify the user that a package that is packaged using standard packaging will be delivered. The standard packaging specifying data may include delivery datasets 42A. When the standard packaging notification process is completed, the control unit 11 terminates the second delivery preparation process.

In the work terminal device 20B, when the terminal control unit 21 receives the standard packaging specifying data, the terminal control unit 21 displays an image on the terminal display unit 25 indicating that the package that is packaged using standard packaging will be delivered. That is, when the precipitation condition is not satisfied based on the total precipitation amount in the package delivery route at the second delivery preparation date and time, which is before the package delivery start date and time, the control unit 11 performs a control to notify the worker that standard packaging has been selected as packaging for the package.

In step S35, the control unit 11 executes a precipitation-resistant packaging selection process. In the precipitation-resistant packaging selection process, the control unit 11 selects precipitation-resistant packaging as packaging for the package. Thus, when the precipitation condition is satisfied based on the total precipitation amount in the package delivery route at the second delivery preparation date and time, which is before the package delivery start date and time, the control unit 11 selects precipitation-resistant packaging for the packaging.

In step S36, the control unit 11 executes a precipitation-resistant packaging notification process. In the precipitation-resistant packaging notification process, the control unit 11 sends precipitation-resistant packaging specifying data to the work terminal device 20B corresponding to the delivery hub ID. The precipitation-resistant packaging specifying data is used to notify the user that a package that is packaged using precipitation-resistant packaging will be delivered. The precipitation-resistant packaging specifying data may include delivery datasets 42A. When the precipitation-resistant packaging notification process is completed, the control unit 11 terminates the second delivery preparation process.

In the work terminal device 20B, when the terminal control unit 21 receives the precipitation-resistant packaging specifying data, the terminal control unit 21 displays an image on the terminal display unit 25 indicating that the package that is packaged using precipitation-resistant packaging will be delivered. That is, when the precipitation condition is satisfied based on the total precipitation amount in the package delivery route at the second delivery preparation date and time, which is before the package delivery start date and time, the control unit 11 performs a control to notify the worker that precipitation-resistant packaging has been selected as packaging for the package.

Thus, the control unit 11 selects one of the types of packaging for the package, including standard packaging and precipitation-resistant packaging, based on precipitation data. The control unit 11 performs a control to notify the worker of the selected packaging for the package.

In a process that is different from the first and second delivery preparation processes, the control unit 11 sends, to the unmanned mobile unit 30, the delivery dataset 42A in the delivery management database 42 corresponding to the delivery number for the delivery target. As a result, the control unit 11 instructs the unmanned mobile unit 30 corresponding to the unmanned vehicle ID to deliver the package. Specifically, the control unit 11 causes the unmanned mobile unit 30 to start delivering the package from the delivery hub address to the delivery address at the delivery start date and time. In particular, the control unit 11 causes the unmanned mobile unit 30 to start delivering the package that is packaged according to the instruction given to the worker. The control unit 11 moves the unmanned mobile unit 30 from the delivery hub address to the delivery address along the delivery route. The control unit 11 causes the unmanned mobile unit 30 to deliver the package to the delivery address.

Operation of First Embodiment

The operation of the first embodiment will now be described.

Figure 8:
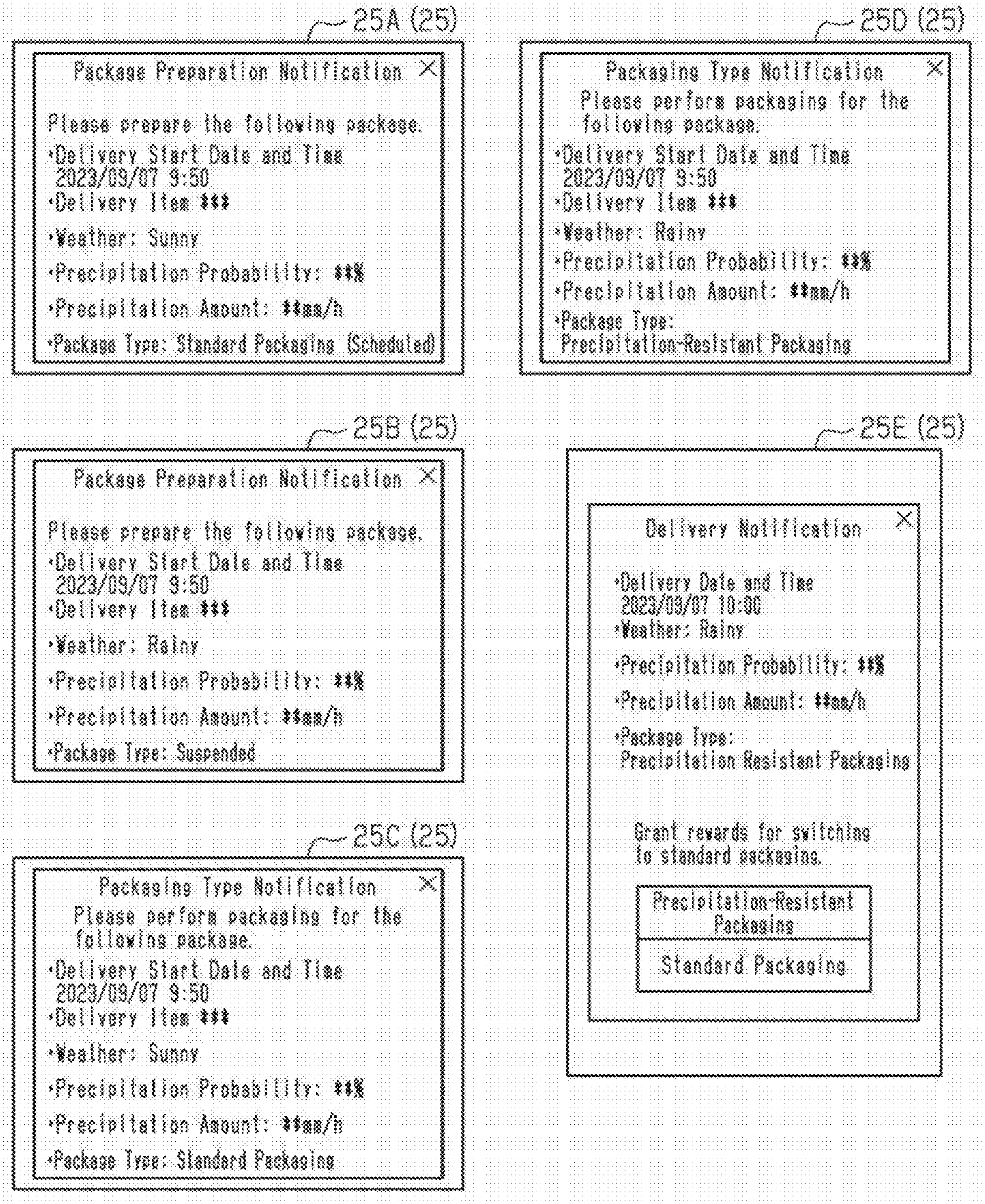
FIG. 8 is a view illustrating the display contents displayed on the terminal display unit in the first and second embodiments.

As shown in FIG. 8, the terminal display unit 25 of the work terminal device 20B may display a first screen 25A. The first screen 25A interacts with the delivery management device 10 to instruct the preparation of a package along with the delivery of the package to the delivery address at the first delivery preparation date and time. In particular, the first screen 25A indicates that standard packaging is scheduled as packaging for the package when the predicted precipitation probability is less than the specified probability. The first screen 25A displays the delivery start date and time, package (delivery item), predicted weather, predicted precipitation probability, predicted precipitation amount, and packaging image. The packaging image may indicate the type of packaging. Thus, when the delivery hub is a store, the store employees acting as workers can collect the items stored in the store as packages while also managing the store. Additionally, they can proceed with preparing to perform packaging for the packages using standard packaging.

Further, the terminal display unit 25 of the work terminal device 20B may display a second screen 25B. The second screen 25B interacts with the delivery management device 10 to instruct the preparation of a package along with the delivery of the package to the delivery address at the first delivery preparation date and time. In particular, the second screen 25B indicates that the packaging for a package will be suspended when the predicted precipitation probability is greater than or equal to the specified probability. The second screen 25B displays the delivery start date and time, package (delivery item), predicted weather, predicted precipitation probability, predicted precipitation amount, and packaging image. Thus, when the delivery hub is a store, the store employees acting as workers can collect the items stored in the store as packages while also managing the store. In this case, there is no need to prepare for packaging for the package.

Furthermore, the terminal display unit 25 of the work terminal device 20B may display a third screen 25C. The third screen 25C interacts with the delivery management device 10 to instruct the preparation of a package along with the delivery of the package to the delivery address at the second delivery preparation date and time. Specifically, the third screen 25C indicates standard packaging is specified as packaging for the package when the precipitation condition is not satisfied. The third screen 25C displays the delivery start date and time, package (delivery item), predicted weather, predicted precipitation probability, predicted precipitation amount, and packaging image. Thus, when the delivery hub is a store, the store employees acting as workers can perform packaging for packages using standard packaging while also managing the store.

Additionally, the terminal display unit 25 of the work terminal device 20B may display a fourth screen 25D. The fourth screen 25D interacts with the delivery management device 10 to instruct the preparation of a package along with the delivery of the package to the delivery address at the second delivery preparation date and time. In particular, the fourth screen 25D indicates that precipitation-resistant packaging is specified as packaging for the package when the precipitation condition is satisfied. The fourth screen 25D displays the delivery start date and time, package (delivery item), predicted weather, predicted precipitation probability, predicted precipitation amount, and packaging image. Thus, when the delivery hub is a store, the store employees acting as workers can perform packaging for packages using precipitation-resistant packaging while also managing the store.

Advantages of First Embodiment

The first embodiment has the following advantages.

(1-1) The control unit 11 selects one of multiple types of packaging for the package, including standard packaging and precipitation-resistant packaging, based on precipitation data corresponding to an area that includes the delivery address for a package. Thus, the control unit 11 can determine packaging for the package by taking into account the precipitation data corresponding to the area that includes the package delivery address. This prevents the package from getting wet in the rain, thereby reducing the risk of quality degradation to the exterior or the contents of the package. Accordingly, the convenience of package delivery by the unmanned mobile unit 30 is enhanced.

(1-2) The control unit 11 performs a control to notify the worker of the determined packaging for the package. This allows the control unit 11 to notify the worker of packaging for the package that does not depend on the discretion of the worker. Accordingly, the worker performs packaging for the package using packaging suitable for the precipitation data corresponding to the area that includes the package delivery address.

(1-3) The control unit 11 obtains the package delivery start date and time based on the package delivery hub address, package delivery address, and package delivery date and time. The control unit 11 determines packaging for the package at a date and time prior to the package delivery start date and time. This allows the worker to recognize the packaging for the package prior to the delivery start date and time, enabling the worker to prepare for the packaging for the package.

(1-4) The control unit 11 obtains, as precipitation data, the precipitation probability at the package delivery date and time in the area that includes the package delivery address. When the precipitation probability is greater than or equal to the specified probability at the first delivery preparation date and time, which is before the package delivery start date and time, the control unit 11 performs a control to notify the worker that packaging for the package will be suspended. Thus, when the precipitation probability is greater than or equal to the specified probability before the package delivery start date and time, the worker can suspend the packaging for the package and work more efficiently. For example, when the precipitation probability is greater than or equal to the specified probability and the worker performs packaging for the package using standard packaging at the first delivery preparation date and time, the worker will have to switch the packaging for the package from standard packaging to precipitation-resistant packaging at the second delivery preparation date and time. In such a case, the worker can avoid repackaging the package by suspending the packaging for the package at the first delivery preparation date and time.

(1-5) The control unit 11 obtains precipitation data corresponding to the area that includes the package delivery route. Thus, the control unit 11 determines packaging for the package by taking into account the precipitation data corresponding to the area that includes the package delivery route as well as the precipitation data corresponding to the area that includes the package delivery address.

(1-6) The control unit 11 obtains, as precipitation data, the predicted precipitation amount in the area including the package delivery route during the period from the package delivery start date and time to the package delivery date and time. The control unit 11 determines packaging for the package based on the total precipitation amount from the delivery start date and time to the delivery date and time in the area that includes the delivery route. This allows the control unit 11 to determine packaging for the package by taking into account the impact according to the total precipitation amount.

Second Embodiment

A second embodiment will now be described. In the description below, the same reference numerals are given to those components that are the same as the corresponding components of the above embodiment. Such elements will not be described or will be briefly described.

Second Delivery Preparation Process

Figure 9:
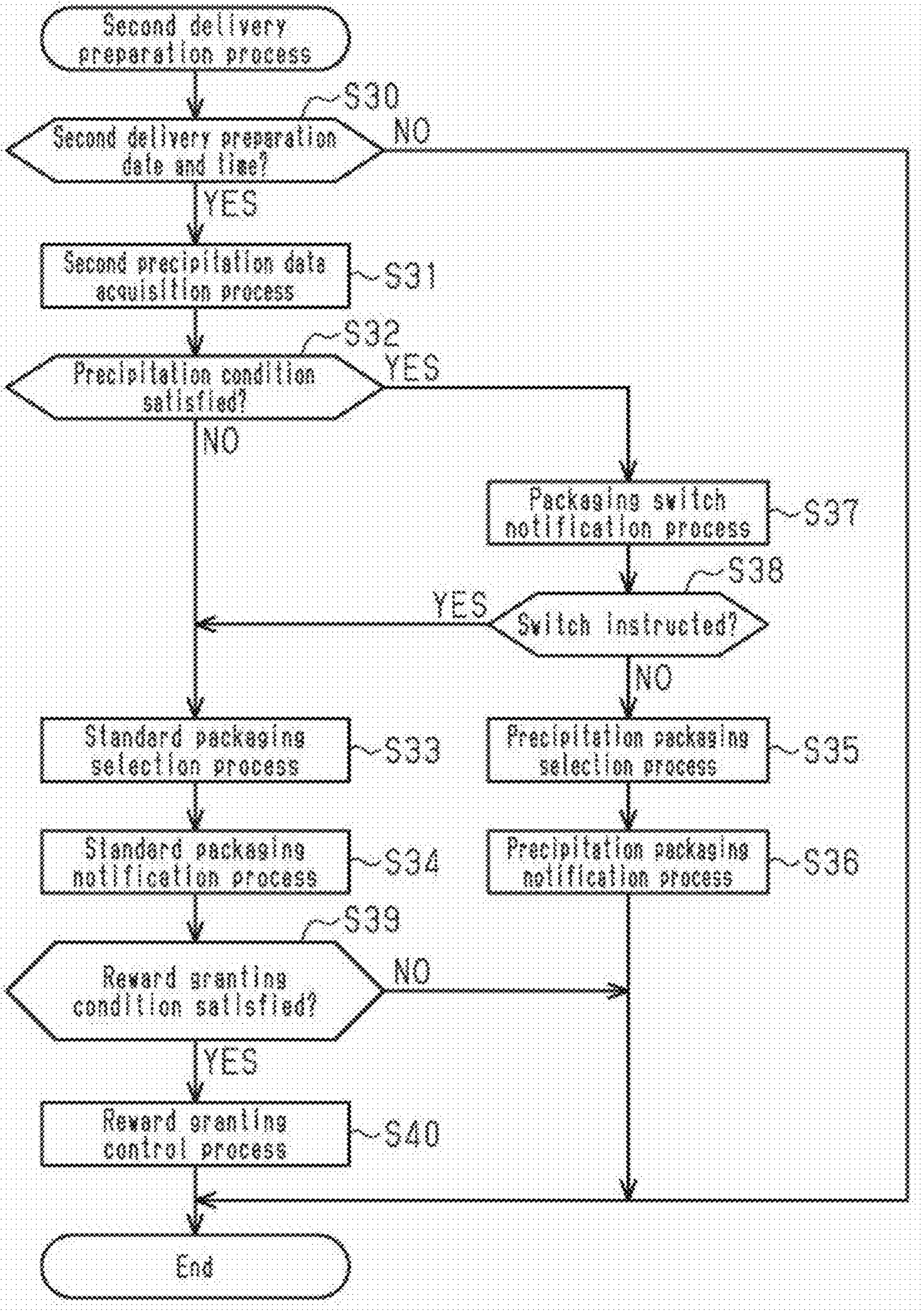
FIG. 9 is a flowchart illustrating a second delivery preparation process executed by the delivery management device in a second embodiment.

As shown in FIG. 9, in the second embodiment, in step S32 of the second delivery preparation process, when determining that the precipitation condition is satisfied, the control unit 11 advances the process to step S37. In step S37, the control unit 11 executes a packaging switch notification process. In the packaging switch notification process, the control unit 11 sends packaging switch request data to the user terminal device 20A corresponding to the user ID. The packaging switch request data indicates a request to switch the packaging for the package from precipitation-resistant packaging to standard packaging. The packaging switch request data may be used to notify the intended recipient that rewards will be granted by switching the packaging for the package from precipitation-resistant packaging to standard packaging. Thus, when precipitation-resistant packaging is selected for package delivery, the control unit 11 notifies the intended recipient of a notification request regarding whether the package will be packaged using precipitation-resistant packaging or the packaging for the package will be switched from precipitation-resistant packaging to standard packaging.

In step S38, the control unit 11 determines whether, as a result of the selection made by the intended recipient according to the selection request, an instruction has been issued to switch the packaging for the package to standard packaging by communicating with the user terminal device 20A. When determining that the instruction has been issued to switch the packaging for the package to standard packaging, the control unit 11 advances the process to step S33. Accordingly, when precipitation-resistant packaging is selected based on the weather and the intended recipient chooses standard packaging as the packaging for the package, the control unit 11 switches the packaging for the package from precipitation-resistant packaging to standard packaging in step S33.

When determining that the instruction to switch the packaging for the package to standard packaging has not been issued, the control unit 11 advances the process to step S35. Specifically, when determining that an instruction not to switch the packaging for the package to standard packaging has been issued, the control unit 11 advances the process to step S35. When determining that no response to the packaging switch request data has been received from the user terminal device 20A by the time a predetermined standby time elapses, the control unit 11 advances the process to step S35. The standby time may be before the delivery start date and time, such as three minutes. Instead, the standby time may be, for example, five minutes. In this case, the second delivery preparation date and time may be, for instance, ten minutes before the delivery start date and time.

When step S34 is completed, the control unit 11 advances the process to step S39. In step S39, the control unit 11 determines whether a reward condition has been satisfied. When determining that the instruction to switch the packaging for the package to standard packaging has been issued, the control unit 11 determines that the reward condition has been satisfied. When determining that the reward condition has not been satisfied, the control unit 11 terminates the second delivery preparation process. When determining that the reward condition has been satisfied, the control unit 11 advances the process to step S40.

In step S40, the control unit 11 executes a reward granting control process. In the reward granting control process, the control unit 11 performs a control to grant rewards at a predetermined reward value to a user who has satisfied the reward condition. Specifically, the control unit 11 refers to the user management database 40 to add the predetermined reward value to the reward value corresponding to the user ID in which the reward condition has been satisfied. Thus, the control unit 11 grants rewards to the intended recipient when the packaging for the package is switched from precipitation-resistant packaging to standard packaging. When the reward granting control process is completed, the control unit 11 terminates the second delivery preparation process.

Operation of Second Embodiment

The operation of the second embodiment will now be described.

As shown in FIG. 8, the terminal display unit 25 of the user terminal device 20A may display a fifth screen 25E. The fifth screen 25E interacts with the delivery management device 10 to display information at the second delivery preparation date and time when a package is delivered to the delivery address. In particular, after precipitation-resistant packaging was chosen as the packaging for the package, the fifth screen 25E notifies the user that packaging for the package can be switched from precipitation-resistant packaging to standard packaging if the precipitation condition is satisfied. Additionally, when packaging for the package is switched from precipitation-resistant packaging to standard packaging, the fifth screen 25E indicates that the intended recipient will be granted rewards. The fifth screen 25E displays the delivery date and time, predicted weather, predicted precipitation probability, predicted precipitation amount, and packaging image.

Additionally, the fifth screen 25E displays instruction images. The instruction images include a continuation instruction image to maintain precipitation-resistant packaging as the packaging for the package and a switch instruction image to switch the packaging for the package from precipitation-resistant packaging to standard packaging. When the continuation instruction image is specified by the intended recipient, the continuation instruction is sent to the delivery management device 10. Thus, the delivery management device 10 can be instructed not to switch the packaging for the package from precipitation-resistant packaging. When the switch instruction image is specified by the intended recipient, the switch instruction is sent to the delivery management device 10. Thus, the delivery management device 10 can be instructed to switch the packaging for the package from precipitation-resistant packaging to standard packaging.

Advantages of Second Embodiment

The second embodiment has the following advantages.

(2-1) If precipitation-resistant packaging was initially selected based on the weather but the intended recipient prefers standard packaging, the control unit 11 switches the packaging for the package from precipitation-resistant packaging to standard packaging. This provides the intended recipient with the opportunity to switch from precipitation-resistant packaging to standard packaging, which is simpler than the precipitation-resistant packaging. As a result, packages can be delivered using appropriate packaging according to the needs of the intended recipient.

(2-2) The control unit 11 grants rewards to the intended recipient when the packaging for the package is switched from precipitation-resistant packaging to standard packaging. Thus, the granting of rewards encourages the intended recipient to switch from precipitation-resistant packaging to standard packaging, which is simpler than the precipitation-resistant packaging.

Third Embodiment

A third embodiment will now be described.

Second Delivery Preparation Process

Figure 10:
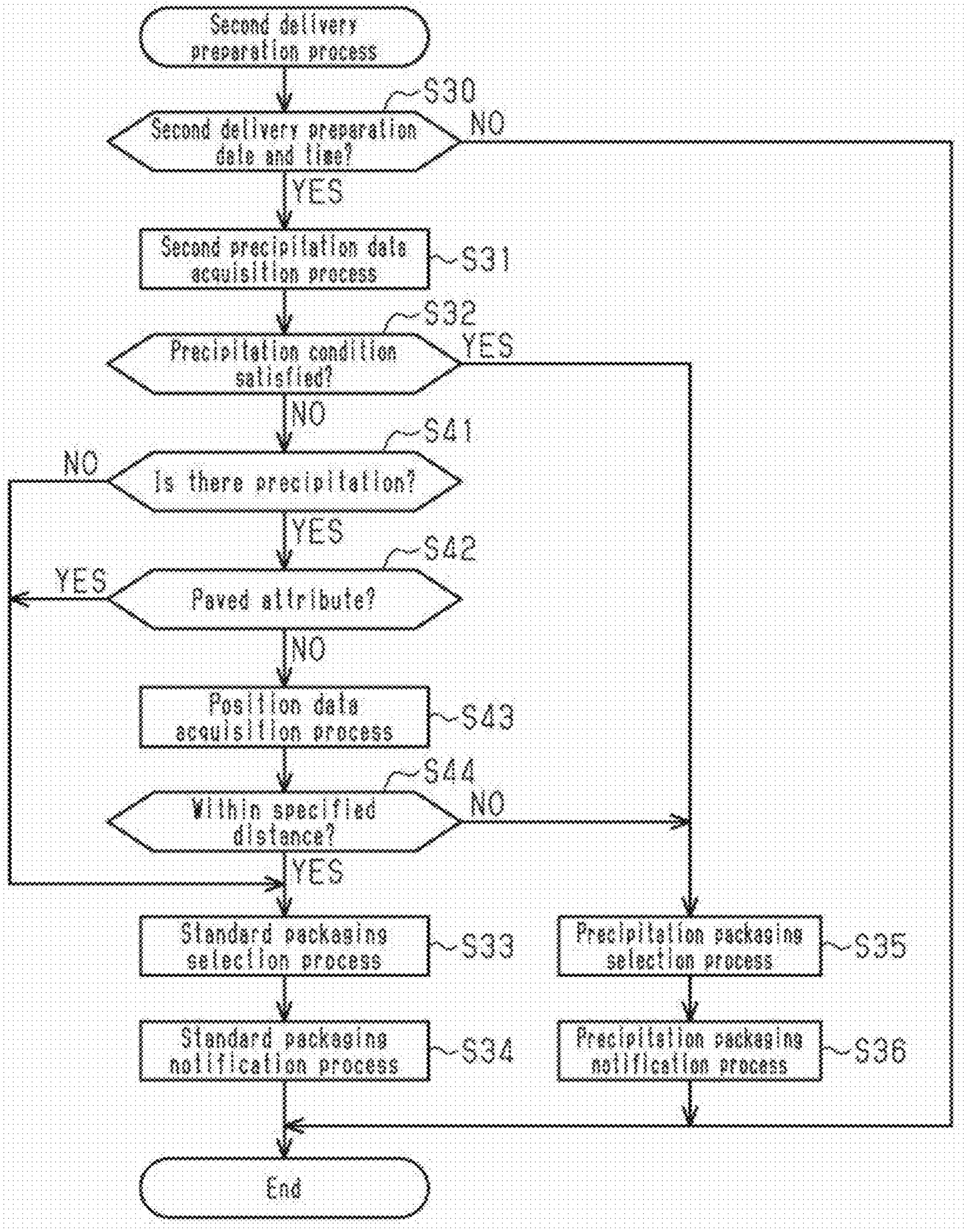
FIG. 10 is a flowchart illustrating a second delivery preparation process executed by the delivery management device in a third embodiment.

As shown in FIG. 10, in the third embodiment, in step S32 of the second delivery preparation process, when determining that the precipitation condition is not satisfied, the control unit 11 advances the process to step S41. In step S41, the control unit 11 determines whether there is precipitation. The control unit 11 may determine whether there is precipitation based on the predicted weather. Specifically, the control unit 11 may determine that there is precipitation when the predicted weather includes rainy conditions. The control unit 11 may determine whether there is precipitation based on the predicted precipitation amount. Specifically, the control unit 11 may determine that there is no precipitation when determines that the predicted precipitation amount is zero. When determining that there is no precipitation, the control unit 11 advances the process to step S33. When determining that there is precipitation, the control unit 11 advances the process to step S42.

In step S42, the control unit 11 determines whether the ground attribute indicates a paved surface based on the ground attribute data corresponding to the delivery datasets 42A. When determining that the ground attribute indicates a paved surface, the control unit 11 advances the process to step S33. When determining that the ground attribute does not indicate a paved surface, the control unit 11 advances the process to step S43.

In step S43, the control unit 11 executes a position data acquisition process. In the position data acquisition process, the control unit 11 obtains the position data of the intended recipient through communication with the user terminal device 20A corresponding to the user ID.

In step S44, the control unit 11 determines whether the position data indicates that the intended recipient is within a specified distance from the package delivery address. When determining that the position data indicates that the intended recipient is within the specified distance from the package delivery address, the control unit 11 advances the process to step S33. When determining that the position data indicates that the intended recipient is not within the specified distance from the package delivery address, the control unit 11 advances the process to step S35.

Thus, the control unit 11 selects the packaging for the package based on the ground attribute data. Specifically, the control unit 11 selects standard packaging for the packaging package when the ground attribute is a paved surface.

The control unit 11 selects the packaging for the package based on the position data of the intended recipient. Particularly, when determining that the position data indicates that the intended recipient is within the specified distance from the package delivery address, the control unit 11 selects standard packaging as the packaging for the package. When determining that the position data indicates that the intended recipient is not within the specified distance from the package delivery address, the control unit 11 selects precipitation-resistant packaging as the packaging for the package.

Advantages of Third Embodiment

The third embodiment has the following advantages.

(3-1) The control unit 11 selects packaging for the package based on the position data of the intended recipient. This allows the control unit 11 to select the packaging for the package by taking into account the position data of the intended recipient. This reduces the risk of quality degradation to the package that would be caused by precipitation. Accordingly, the convenience of package delivery by the unmanned mobile unit 30 is enhanced.

(3-2) The control unit 11 selects the packaging for the package based on the ground attribute data for a delivery location. Thus, the control unit 11 can select the packaging for the package by taking into account the ground where the package will be placed. This prevents the package placed on muddy ground from getting dirty due to rain.

MODIFICATIONS

The present embodiments may be modified as follows. The present embodiment and the following modifications can be combined as long as they remain technically consistent with each other.

In the second embodiment, the control unit 11 may execute the processes of S30 to S32, S37, S38 at a third delivery preparation date and time, which is later than the first delivery preparation date and time and earlier than the second delivery preparation date and time. In this case, the control unit 11 obtains precipitation data at the third delivery preparation date and time. When the precipitation condition is satisfied, the control unit 11 sends packaging switch request data to the user terminal device 20A. When a switch instruction has not been issued to switch the packaging for the package to standard packaging before the second delivery preparation date and time, the control unit 11 executes the processes of steps S35, S36 at the second delivery preparation date and time. When a switch instruction has been issued to switch the packaging for the package to standard packaging before the second delivery preparation date and time, the control unit 11 executes the processes of steps S33, S34, S39, S40 at the second delivery preparation date and time. At the third delivery preparation date and time, the control unit 11 obtains precipitation data. When the precipitation condition is not satisfied, the control unit 11 executes the processes of steps S33, S34, S39, S40 at the second delivery preparation date and time.

In the third embodiment, in step S44, the control unit 11 may determine whether the intended recipient will reach the package delivery address at the package delivery date and time based on the travel time of the intended recipient. In this case, the control unit 11 may obtain the travel time of the intended recipient based on the position data and package delivery address of the intended recipient. When determining that the intended recipient will reach the package delivery address on the package delivery date and time, the control unit 11 advances the process to step S33. When determining that the intended recipient will not reach the package delivery address on the package delivery date and time, the control unit 11 advances the process to step S35.

In the third embodiment, before the delivery start date and time, the control unit 11 may move another unmanned mobile unit 30, which is different from the unmanned mobile unit 30 for package delivery, to the delivery address and may obtain the ground attribute data from images captured by the other unmanned mobile unit 30.

In the third embodiment, the control unit 11 may deduct an amount equivalent to the reward value from the package delivery fee when the reward granting condition is satisfied. In other words, the intended recipient can use rewards as part of the delivery fee. The control unit 11 may use rewards granted as part of the delivery fee according to instructions from the intended recipient. The control unit 11 may execute processes by combining the second embodiment with the third embodiment.

The control unit 11 may notify the worker to suspend the packaging for a package when the predicted total precipitation amount is greater than or equal to a threshold value at the first delivery preparation date and time. The control unit 11 may notify the worker to suspend the packaging of for the package when the predicted weather indicates that there will be precipitation at the first delivery preparation date and time. That is, the control unit 11 may notify the worker to suspend the packaging for the package based on precipitation data at the first delivery preparation date and time.

The control unit 11 may notify the worker to start preparing for a package using standard packaging when the predicted total precipitation amount is less than the threshold value at the first delivery preparation date and time. The control unit 11 may notify the worker to start preparing for a package using standard packaging when the predicted weather indicates that there will be no precipitation at the first delivery preparation date and time. That is, the control unit 11 may notify the worker to start preparing for a package using standard packaging based on precipitation data at the first delivery preparation date and time.

The control unit 11, when determining that there will be no precipitation at the first delivery preparation date and time, may select standard packaging as packaging for the package and notify the worker of the selection result. In this case, based on precipitation data, the control unit 11 may switch the packaging for the package to precipitation-resistant packaging at the second delivery preparation date and time and notify the worker of the switch result.

The control unit 11 may calculate, as the total predicted precipitation amount in the delivery route, the result of calculating the delivery distance from the delivery hub address to the delivery address and the predicted precipitation amount. The control unit 11 may calculate the delivery travel time based on the delivery distance from the delivery hub address to the delivery address and the travel speed of the unmanned mobile unit 30 and may calculate, as the predicted total precipitation amount in the delivery route, the result of accumulating the delivery travel time and the predicted precipitation amount.

The control unit 11 may obtain precipitation data once at one or three or more scheduled delivery preparation date and times. For example, the control unit 11 may execute the second delivery preparation process at the second delivery preparation date and time without executing the first delivery preparation process at the first delivery preparation date and time. The control unit 11 may execute various processes on the first, second, and third delivery preparation date and time.

There may be three or more types of packaging for the package. For example, there may be two or more types of standard packaging, and there may be two or more types of precipitation-resistant packaging. The control unit 11 may select one of two or more types of precipitation-resistant packaging based on precipitation data, such as predicted weather, predicted precipitation amount, or predicted precipitation probability.

The control unit 11 may, for example, grant discount coupons as rewards for the intended recipient. Discount coupons may, for example, provide discounts on at least one of item purchases, travel, or other services. These coupons may also be available at affiliated stores. Additionally, the control unit 11 may grant items, travel, and services as rewards for the intended recipient.

The control unit 11 may receive the delivery datasets 42A through communication with the terminal device 20 without using another server. The control unit 11 may receive the delivery datasets 42A through communication with the terminal device 20 via another server.

The control unit 11 may obtain precipitation data for the current date and time instead of the precipitation data predicted for the delivery date and time. Specifically, when the current date and time and the delivery date and time fall within the same time slot, the control unit 11 may obtain precipitation data for the current date and time. The control unit 11 may obtain precipitation data predicted for the delivery date and time when the current date and time fall within a time slot that differs from that of the delivery date and time.

The user terminal device 20A may be any device capable of identifying at least the position data of the intended recipient. For example, the delivery management system 1 may identify the position data of the intended recipient via a navigation device installed in the automobile owned by the intended recipient, instead of the user terminal device 20A.

The unmanned mobile unit 30 does not need to have a human onboard; for example, it can be an unmanned ground vehicle, which travels on the ground. The unmanned mobile unit 30 may be, for example, a vehicle that flies in the air and/or travels on the ground.

The delivery management system 1 may include a manager device in addition to the delivery management device 10, terminal device 20, and unmanned mobile unit 30. The manager device is used by a manager who manages the delivery management system 1 or by a manager who manages the unmanned mobile unit 30. The manager device may have a similar configuration to the terminal device 20. The manager may use the manager device to monitor a process of placing a package by the unmanned mobile unit 30.

The unmanned mobile unit 30 may include some or all of the functions of the delivery management device 10. The unmanned vehicle controller 31 may include some or all of the functions of the delivery management device 10. In this case, the unmanned vehicle control unit 32 of the unmanned mobile unit 30 may have a similar configuration to the control unit 11. In other words, the unmanned mobile unit 30 may be an example of the delivery management device.

The delivery management system 1 may be configured to include functions similar to those of the control unit 11 in either the control unit 11 or the unmanned vehicle control unit 32.

The expression "at least one of" as used herein means "one or multiple" of desired options. For example, the phrase "at least one of" as used in this description means "only one choice" or "both of two choices" in a case in which the number of choices is two. In another example, the phrase "at least one of" as used in this description means "only one single choice" or "any combination of two or more choices" if the number of its choices is three or more.

CLAUSES

Technical concepts that can be understood from each of the above embodiments and modifications will now be described.

Clause A

A delivery management device, including:

- a delivery address acquisition unit that obtains a delivery address for a package to be delivered by an unmanned mobile unit;
- a precipitation data acquisition unit that obtains precipitation data corresponding to an area that includes the delivery address for the package obtained by the delivery address acquisition unit; and
- a packaging determination unit that selects one of multiple types of packaging for the package, including standard packaging and precipitation-resistant packaging, based on the precipitation data obtained by the precipitation data acquisition unit.

Clause B

The delivery management device according to clause A, further comprising a notification control unit that controls a notification related to package delivery, where the notification control unit performs a control to notify a worker of the packaging for the package selected by the packaging determination unit.

Clause C

The delivery management device according to clause A or B, further comprising:

- a delivery date-and-time acquisition unit that obtains a delivery date and time for the package delivered by the unmanned mobile unit;
- a delivery hub address acquisition unit that obtains a delivery hub address for the package delivered by the unmanned mobile unit; and
- a delivery start date-and-time acquisition unit that obtains a delivery start date and time for the package based on the delivery hub address for the package obtained by the delivery hub address acquisition unit, the delivery address for the package obtained by the delivery address acquisition unit, and the delivery date and time for the package obtained by the delivery date-and-time acquisition unit, where the delivery of the package is started at the delivery hub for the package obtained by the delivery hub address acquisition unit at the delivery start date and time for the package, where
- the packaging determination unit determines the packaging for the package at a date and time prior to the delivery start date and time for the package obtained by the delivery start date-and-time acquisition unit.

Clause D

The delivery management device according to clause C, further comprising a notification control unit that controls a notification related to package delivery, where

- the precipitation data acquisition unit obtains, as precipitation data, a precipitation probability corresponding to the delivery date and time for the package obtained by the delivery date-and-time acquisition unit and corresponding to an area that includes the delivery address for the package obtained by the delivery address acquisition unit, and
- when the precipitation probability obtained by the precipitation data acquisition unit is greater than or equal to a specified probability at the first delivery preparation date and time prior to the delivery start date and time for the package obtained by the delivery start date-and-time acquisition unit, the notification control unit performs a control to notify the worker that the packaging for the package is to be suspended.

Clause E

The delivery management device according to any one of clauses A to D, further comprising:

- a delivery hub address acquisition unit that obtains a delivery hub address for the package delivered by the unmanned mobile unit; and
- a delivery route acquisition unit that obtains a delivery route for the package from the delivery hub address for the package obtained by the delivery hub address acquisition unit to the delivery address for the package obtained by the delivery address acquisition unit, where
- the precipitation data acquisition unit obtains precipitation data corresponding to an area that includes the delivery route for the package obtained by the delivery route acquisition unit.

Clause F

The delivery management device according to clause E, further comprising:

- a delivery date-and-time acquisition unit that obtains a delivery date and time for the package delivered by the unmanned mobile unit; and a delivery start date-and-time acquisition unit that obtains a delivery start date and time for the package based on the delivery hub address for the package obtained by the delivery hub address acquisition unit, the delivery address for the package obtained by the delivery address acquisition unit, and the delivery date and time for the package obtained by the delivery date-and-time acquisition unit, where the delivery of the package is started at the delivery hub for the package obtained by the delivery hub address acquisition unit at the delivery start date and time for the package, where the precipitation data acquisition unit obtains, as precipitation data, a precipitation amount corresponding to a period from the delivery start date and time for the package obtained by the delivery start date-and-time acquisition unit to the delivery date and time for the package obtained by the delivery date-and-time acquisition unit and corresponding to an area including the delivery route for the package obtained by the delivery route acquisition unit, and the packaging determination unit determines the packaging for the package based on a total precipitation amount in the delivery route for the package obtained by the delivery route acquisition unit.

Clause G

The delivery management device according to any one of clauses A to F, further comprising a position data acquisition unit that obtains position data of an intended recipient, where the packaging determination unit selects the packaging for the package based on the position data of the intended recipient obtained by the position data acquisition unit.

Clause H

The delivery management device according to any one of clauses A to G, further comprising a ground attribute data acquisition unit that obtains ground attribute data at the delivery address for the package obtained by the delivery address acquisition unit, where the packaging determination unit selects the packaging for the package based on the ground attribute data obtained by the ground attribute data acquisition unit.

Clause I

The delivery management device according to any one of clauses A to H, further comprising a notification control unit that controls a notification related to package delivery, where when the package determination unit determines the precipitation-resistant packaging, the notification control unit performs a control to notify an intended recipient of a selection request regarding whether the package is to be wrapped using the precipitation-resistant packaging, and when selecting the precipitation-resistant packaging and obtaining from the intended recipient a selection result indicating that the package is to be packaged using the standard packaging according to the selection request, the packaging determination unit switches the packaging for the package from the precipitation-resistant packaging to the standard packaging.

Clause J

The delivery management device according to clause I, further comprising a reward granting unit that grants rewards to the intended recipient, where the reward granting unit grants rewards to the intended recipient when the packaging for the package is switched from the precipitation-resistant packaging to the standard packaging.

Clause K

A delivery management system, including:

a delivery address acquisition unit that obtains a delivery address for a package to be delivered by an unmanned mobile unit;

a precipitation data acquisition unit that obtains precipitation data corresponding to an area that includes the delivery address for the package obtained by the delivery address acquisition unit; and a packaging determination unit that selects one of multiple types of packaging for the package, including standard packaging and precipitation-resistant packaging, based on the precipitation data obtained by the precipitation data acquisition unit.

Clause L

A delivery management method, including:

obtaining, by one or more computers, a delivery address for a package to be delivered by an unmanned mobile unit;

obtaining, by the one or more computers, precipitation data corresponding to an area that includes the delivery address for the package; and selecting, by the one or more computers, one of multiple types of packaging for the package, including standard packaging and precipitation-resistant packaging, based on the precipitation data.

Clause M

A program that causes one or more computers to execute:

obtaining a delivery address for a package to be delivered by an unmanned mobile unit;

obtaining precipitation data corresponding to an area that includes the delivery address for the package; and selecting one of multiple types of packaging for the package, including standard packaging and precipitation-resistant packaging, based on the precipitation data.

Various switches in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A delivery management system, comprising:

communication circuitry;

a memory that stores program code; and at least one processor configured to read the program code and operate as instructed by the program code, the program code including:

first obtaining code configured to cause the at least one processor to obtain a delivery address for a package to be delivered by an unmanned aerial vehicle (UAV) comprising an imaging device;

second obtaining code configured to cause the at least one processor to obtain precipitation data for an area that includes the delivery address, the precipitation data including a precipitation probability in the area at the delivery date and time;

notification code configured to cause the at least one processor to send an instruction of suspending the packaging to a work terminal device used by a worker packaging the package based on determining the precipitation probability is greater than or equal to a specified probability at a first date and time that is before the delivery start date and time;

first communicating code configured to cause the at least one processor to communicate with a user terminal device carried by the intended recipient, via the communication circuitry establishing a connection over a wireless network with communication circuitry of the user terminal device, to determine a distance between a location of the intended recipient and the delivery address based on global position data of the user terminal device;

first determining code configured to cause the at least one processor to determine a type of packaging for the package based on the precipitation data and the distance between the location of the intended recipient and the delivery address, wherein the determination of the type of packaging includes selecting one of multiple types of packaging including standard packaging and precipitation-resistant packaging; and second communicating code configured to cause the at least one processor to communicate with the UAV, via the communication circuitry establishing a connection over the wireless network with communication circuitry of the UAV, to initiate delivery of the package by transmitting one or more instructions to the UAV that causes power to be supplied to an engine of the UAV to move autonomously towards the delivery address based on one more images of a surrounding environment captured by the imaging device and place the package at the delivery address based on one or more images of a delivery position captured by the imaging device, the package delivered via a holding structure of the UAV that moves and detaches the package from the UAV via electrification and de-electrification of the holding structure.

2. The delivery management system according to claim 1, wherein the program code further includes:

notification code configured to cause the at least one processor to send the determined type of packaging to the work terminal device.

3. The delivery management system according to claim 1, wherein the program code further includes:

third obtaining code configured to cause the at least one processor to obtain a delivery date and time for the package to be delivered by the UAV;

fourth obtaining code configured to cause the at least one processor to obtain an address of a delivery hub of the UAV; and fifth obtaining code configured to cause the at least one processor to obtain a delivery start date and time at which the UAV starts to deliver the package, the delivery start date and time being determined based on the address of the delivery hub, the delivery address, and the delivery date and time, wherein the type of packaging is determined before the delivery start date and time.

4. The delivery management system according to claim 1, wherein the program code further includes:

third obtaining code configured to cause the at least one processor to obtain an address of a delivery hub of the UAV; and fourth obtaining code configured to cause the at least one processor to obtain a delivery route for the package from the delivery hub to the delivery address, wherein the precipitation data includes the precipitation data for the area including the delivery route.

5. The delivery management system according to claim 4, wherein the program code further includes:

fifth obtaining code configured to cause the at least one processor to obtain a delivery date and time for the package to be delivered by the UAV; and sixth obtaining code configured to cause the at least one processor to obtain a delivery start date and time at which the UAV starts to deliver the package, the delivery start date and time being determined based on the address of the delivery hub, the delivery address, and the delivery date and time, wherein the precipitation data includes a precipitation amount in the area including the delivery route during a period from the delivery start date and time to the delivery date and time, and wherein the type of packaging is determined based on a total precipitation amount from the delivery start date and time to the delivery date and time in the area including the delivery route.

6. The delivery management system according to claim 1, wherein the program code further includes:

third obtaining code configured to obtain position data of an intended recipient of the package, and wherein the type of packaging is determined based on the position data of the intended recipient.

7. The delivery management system according to claim 1, wherein the program code further includes:

third obtaining code configured to cause the at least one processor to execute the program to obtain a ground attribute data for the delivery address, wherein the ground attribute data includes an attribute of a ground where the package is left unattended, and wherein the type of packaging is determined based on the attribute of the ground.

8. The delivery management system according to claim 1, wherein the program code includes:

notification code configured to cause the at least one processor to notify, based on determining the precipitation-resistant packaging is selected based on the precipitation data, the intended recipient of the package of a selection request regarding whether the package is to be packaged using the precipitation-resistant packaging;

third obtaining code configured to cause the at least one processor to obtain a selection result according to the selection request from the intended recipient, wherein the selection result includes a type of packaging preferred by the intended recipient; and switching code configured to cause the at least one processor to switch, based on determining the type of packaging included in the selection result is the standard packaging, the type of packaging from the precipitation-resistant packaging to the standard packaging.

9. The delivery management system according to claim 8, wherein the program code further includes:

granting code configured to cause the at least one processor to grant rewards to the intended recipient when the type of packaging is switched to the standard packaging based on the selection result.

10. The delivery management system according to claim 1, wherein based on determining that the distance between the location of the intended recipient and the delivery address is less than or equal to a predetermined distance, standard packaging is selected.

11. The delivery management system according to claim 1, wherein based on determining the distance between the location of the intended recipient and the delivery address is greater than a predetermined distance and a precipitation amount indicated by the precipitation data is greater than a threshold value, precipitation-resistant packaging is selected.

12. A delivery management method, comprising:

obtaining, by one or more computers of a delivery management system, a delivery address for a package to be delivered by an unmanned aerial vehicle (UAV) comprising an imaging device;

obtaining, by the one or more computers, precipitation data for an area that includes the delivery address, the precipitation data including a precipitation probability in the area at the delivery date and time;

sending an instruction of suspending the packaging to a work terminal device used by a worker packaging the package based on determining the precipitation probability is greater than or equal to a specified probability at a first date and time that is before the delivery start date and time;

communicating with a user terminal device carried by the intended recipient, via communication circuitry of the delivery management system establishing a connection over a wireless network with communication circuitry of the user terminal device, to determine a distance between a location of the intended recipient and the delivery address based on global position data of the user terminal device;

determining, by the one or more computers based on the precipitation data and the distance between the location of the intended recipient and the delivery address, a type of packaging for the package, wherein the determining includes selecting one of multiple types of packaging including standard packaging and precipitation-resistant packaging; and communicating with the UAV, via the communication circuitry of the delivery management system establishing a connection over the wireless network with communication circuitry of the UAV, to initiate delivery of the package by transmitting one or more instructions to the UAV that causes power to be supplied to an engine of the UAV to move autonomously towards the delivery address based on one more images of a surrounding environment captured by the imaging device and place the package at the delivery address based on one or more images of a delivery position captured by the imaging device, the package delivered via a holding structure of the UAV that moves and detaches the package from the UAV via electrification and de-electrification of the holding structure.

13. A non-transitory computer-readable medium storing a program for causing one or more computers of a delivery management system to execute:

obtaining a delivery address for a package to be delivered by an unmanned aerial vehicle (UAV) comprising an imaging device;

obtaining precipitation data for an area that includes the delivery address, the precipitation data including a precipitation probability in the area at the delivery date and time;

sending an instruction of suspending the packaging to a work terminal device used by a worker packaging the package based on determining the precipitation probability is greater than or equal to a specified probability at a first date and time that is before the delivery start date and time;

communicating with a user terminal device carried by the intended recipient, via communication circuitry of the delivery management system establishing a connection over a wireless network with communication circuitry of the user terminal device, to determine a distance between a location of the intended recipient and the delivery address based on global position data of the user terminal device;

determining, based on the precipitation data and the distance between the location of the intended recipient and the delivery address, a type of packaging for the package, wherein the determining includes selecting one of multiple types of packaging including standard packaging and precipitation-resistant packaging; and communicating with the UAV, via the communication circuitry of the delivery management system establishing a connection over the wireless network with communication circuitry of the UAV to initiate delivery of the package by transmitting one or more instructions to the UAV that causes power to be supplied to an engine of the UAV to move autonomously towards the delivery address based on one more images of a surrounding environment captured by the imaging device and place the package at the delivery address based on one or more images of a delivery position captured by the imaging device, the package delivered via a holding structure of the UAV that moves and detaches the package from the UAV via electrification and de-electrification of the holding structure.

* * * * *